(12) United States Patent
MacLeod et al.

(10) Patent No.: US 10,802,036 B2
(45) Date of Patent: Oct. 13, 2020

(54) SYSTEM AND METHODS FOR UPDATING A REFERENCE TIME FROM A DECAYING ROTATIONAL PERIOD OF A PULSAR

(71) Applicant: Booz Allen Hamilton Inc., McLean, VA (US)

(72) Inventors: William MacLeod, Fort Washington, MD (US); James Ter Beest, Washington, DC (US); Gideon Bass, Silver Spring, MD (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 118 days.

(21) Appl. No.: 16/131,573

(22) Filed: Sep. 14, 2018

(65) Prior Publication Data

US 2020/0088754 A1    Mar. 19, 2020

(51) Int. Cl.
  *G01P 3/44* (2006.01)
  *G01V 3/36* (2006.01)
  *G01T 1/29* (2006.01)
  *G06F 16/23* (2019.01)

(52) U.S. Cl.
  CPC .............. *G01P 3/44* (2013.01); *G01T 1/2907* (2013.01); *G01V 3/36* (2013.01); *G06F 16/23* (2019.01)

(58) Field of Classification Search
  None
  See application file for complete search history.

(56) References Cited

U.S. PATENT DOCUMENTS

| | | | |
|---|---|---|---|
| 7,197,381 B2 | 3/2007 | Sheikh et al. | |
| 8,219,432 B1 * | 7/2012 | Bradley | G06Q 10/06311 |
| | | | 705/7.13 |
| 9,886,841 B1 * | 2/2018 | Nave | B60W 10/04 |

FOREIGN PATENT DOCUMENTS

RU    2378676    1/2010

OTHER PUBLICATIONS

Hobbs, G., et al., Development of Pulsar-Based Timescale, Mon. Not. R. Astron, Soc., 2018.
Johnston, H., Pulsar Timekeepers Measure Up to Atomic Clocks, 2012, Physics World, Telescopes and Space Missions Research Update, IOP Publishing Ltd.
(Continued)

*Primary Examiner* — Tung S Lau
(74) *Attorney, Agent, or Firm* — Buchanan Ingersoll & Rooney PC

(57) ABSTRACT

Disclosed is a system for updating a reference time from a decaying rotational period of a pulsar. The system can include: a database (DB) configured to store: coordinates for a pulsar; a recorded rate of rotation (RROR) for the pulsar; a rotational rate of decay (RROD) function for the pulsar; and a recorded reference time for the pulsar. A sensor can be configured to collect electromagnetic pulsar radiation from the pulsar and generate sensor data. A signal processor module can be configured to receive the sensor data, generate an observed rate of rotation (OROR) signal profile, generate a current rate of rotation (CROR) for the pulsar from the OROR signal profile, and update the RROR from the CROR. A time processor module can be configured to receive the RROD function and the CROR, and to solve the RROD function to output a reference time of the pulsar.

20 Claims, 10 Drawing Sheets

(56) References Cited

OTHER PUBLICATIONS

Manchester, R.N., et al., Pulsar Timing and Its Applications, 2017, Journal of Physics: Conf. Series 932, IOP Publishing.
ntemational Search Report and Written Opinion of the International Searching Authority for PCT/US19/50935 filed Sep. 13, 2019 dated Nov. 27, 2019.

* cited by examiner

Storing pulsar information 101 about one or more pulsars 102, the pulsar information 101 including:
coordinates for the one or more pulsars 102;
a recorded rate of rotation (RROR) for the one or more pulsars 102 102, recorded from observation at a previous reference time, wherein the RROR has a RROR period;
a rotational rate of decay (RROD) function for the one or more pulsars 102; and
a recorded reference time for the one or more pulsars 102, periodically updated by an internal clock

Collecting pulsar radiation from the one or more pulsars 102, the pulsar radiation including an observed rate of rotation (OROR) for the one or more pulsars 102

Generating an OROR signal profile based on the OROR and the RROR

Generating a current rate of rotation (CROR) for the one or more pulsars 102

Solving the RROD function to generate an output that is a reference time 106 of the one or more pulsars 102

Transmitting the reference time to a time keeping device 104

FIG. 4

SYSTEM AND METHODS FOR UPDATING A REFERENCE TIME FROM A DECAYING ROTATIONAL PERIOD OF A PULSAR

FIELD

Disclosed are systems and methods that can observe the rotational decay of a pulsar and update a reference time based on the observed rotational decay.

BACKGROUND INFORMATION

Known clocks and methods for keeping time involve the use of precision clocks (e.g., pulsar clocks, atomic clocks, quantum clocks, etc.) as a means to "hold" a reference time from which other clocks can be synchronized. For example, a pulsar clock uses the coherence of the pulsar's radiation pulses as the frequency standard for its timekeeping. The frequency standard from the pulsar clock is then used to synchronize other clocks. Known clocks and timekeeping methods are limited in that they rely on a previously configured clock that holds the reference time. This can be problematic for an apparatus that has no access to a previously configured clock (e.g., is too far from the clock) to resynchronize its clock with the reference time.

SUMMARY

An embodiment of a system for updating a reference time from a decaying rotational period of one or more pulsars can include: a database (DB) configured to store pulsar information about one or more pulsars, the pulsar information including: coordinates for the one or more pulsars; a recorded rate of rotation (RROR) for the one or more pulsars, recorded from observation at a previous reference time, wherein the RROR has a RROR period; a rotational rate of decay (RROD) function for the one or more pulsars; and a recorded reference time for the one or more pulsars, periodically updated by an internal clock; a sensor configured to collect electromagnetic pulsar radiation from the one or more pulsars and generate sensor data; a signal processor module configured to receive the sensor data, generate an observed rate of rotation (OROR) signal profile based on the sensor data and the RROR, generate a current rate of rotation (CROR) for the one or more pulsars from the OROR signal profile, and update the RROR from the CROR; and a time processor module configured to receive the RROD function and the CROR, and to solve the RROD function to output a reference time of the one or more pulsars; wherein the system is configured to transmit the reference time as an update to a time keeping device.

An embodiment of a method for updating a reference time from a decaying rotational period of one or more pulsars can involve: storing pulsar information about one or more pulsars, the pulsar information including: coordinates for the one or more pulsars; a recorded rate of rotation (RROR) for the one or more pulsars, recorded from observation at a previous reference time, wherein the RROR has a RROR period; a rotational rate of decay (RROD) function for the one or more pulsars; and a recorded reference time for the one or more pulsars, periodically updated by an internal clock; collecting pulsar radiation from the one or more pulsars, the pulsar radiation including an observed rate of rotation (OROR) for the one or more pulsars; generating an OROR signal profile based on the OROR and the RROR; generating a current rate of rotation (CROR) for the one or more pulsars; solving the RROD function to generate an output that is a reference time of the one or more pulsars; and transmitting the reference time to a time keeping device.

BRIEF DESCRIPTION OF THE DRAWINGS

Other features and advantages of the present disclosure will become more apparent upon reading the following detailed description in conjunction with the accompanying drawings, wherein like elements are designated by like numerals, and wherein:

FIG. 4 shows an exemplary process flow diagram for an embodiment of the system;

FIGS. 9A-9B show another exemplary process flow diagram for an embodiment of the system, wherein FIG. 9B is a continuation of the exemplary process flow diagram of FIG. 9A.

DETAILED DESCRIPTION

Figure 1:
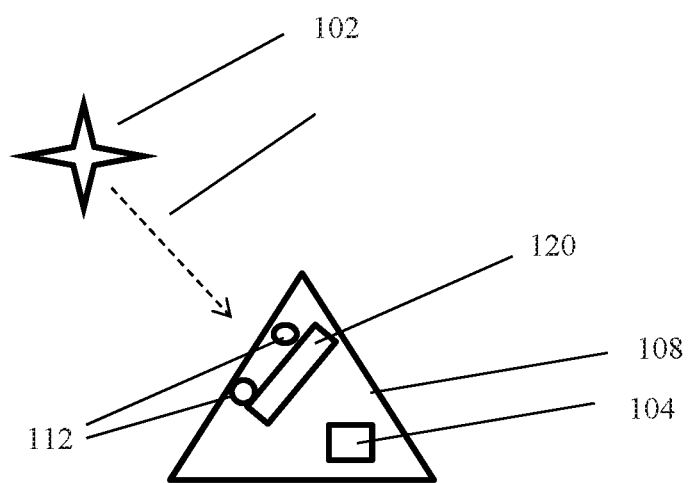
FIG. 1 shows an exemplary embodiment of a system for updating a reference time from a pulsar's radiation.
Figure 2:
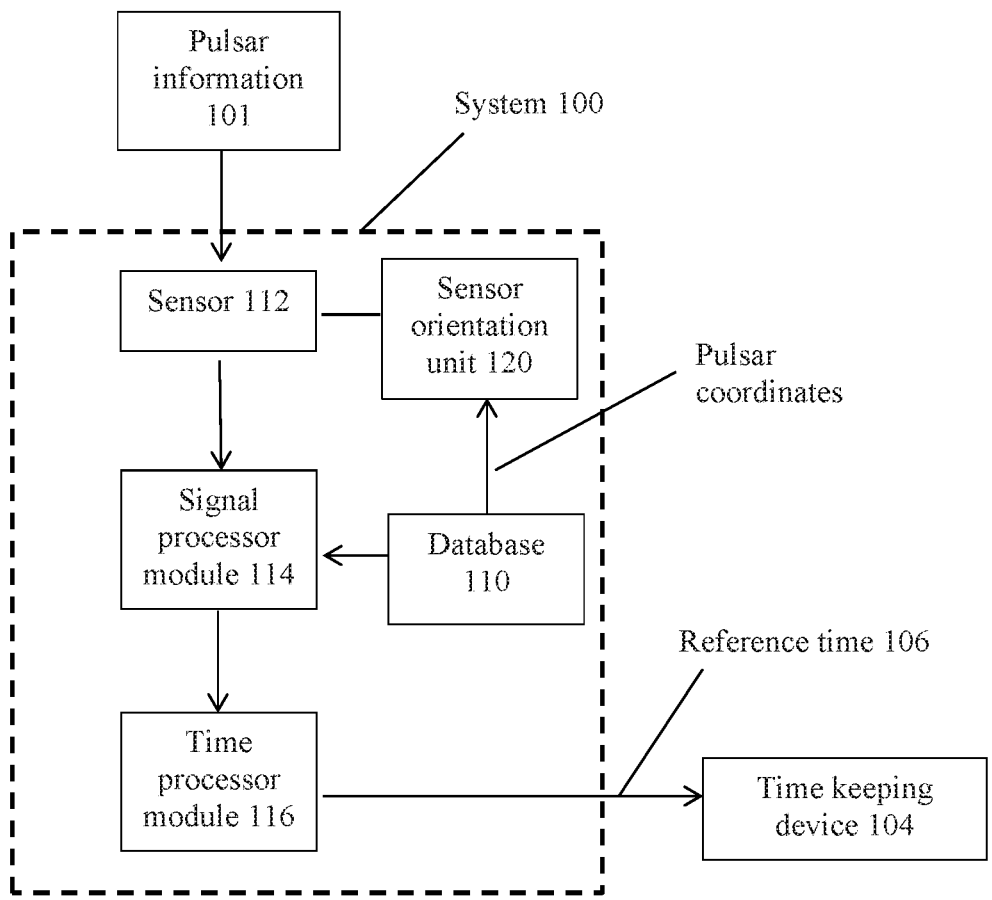
FIG. 2 shows an exemplary architecture diagram for an embodiment of the system.
Figure 3:
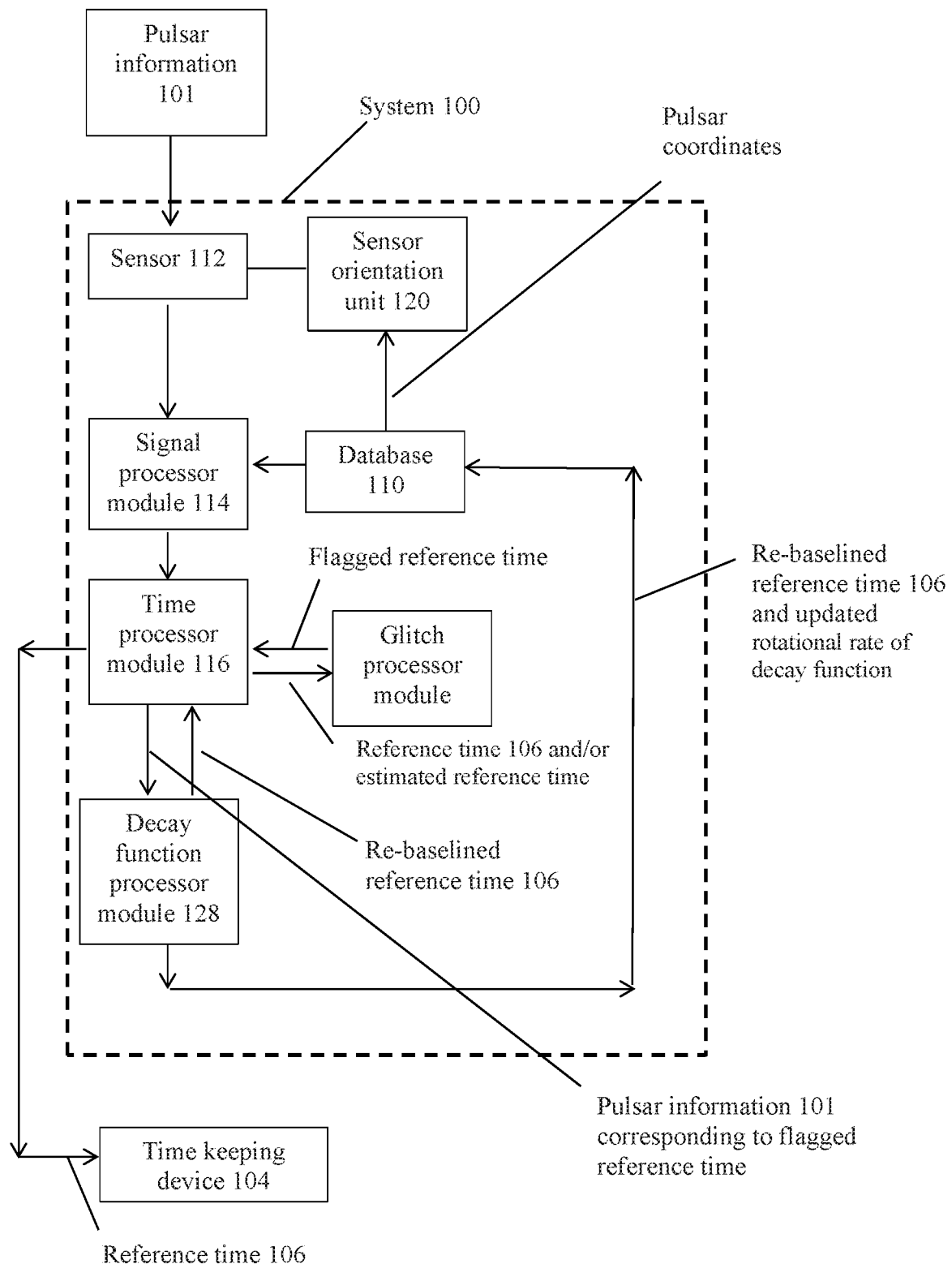
FIG. 3 shows another exemplary architecture diagram for an embodiment of the system.

Referring to FIGS. 1-4, an embodiment of the system 100 can relate to updating a reference time from a decaying rotational period of one or more pulsars 102. A pulsar 102 is a neutron star that emits a beam of electromagnetic radiation. The pulsar 102 also rotates, and as it rotates the beam of electromagnetic radiation is observable as a series of pulses when an observer comes into the path of the rotating beam. The beam rotates at a very stable rate making it suitable for maintaining a frequency standard (or time period) for a time keeping device 104. While the rate of rotation does decay, it does so at a very slow and very predictable rate. An embodiment of the system 100 can be configured to use a previously established reference time of a pulsar 102 and generate an updated reference time 106 based on the observable decaying rotational period of the pulsar 102. Some embodiments can use plural pulsars 102 to improve the accuracy of the updated reference time 106. The updated reference time 106 can be used to synchronize a time keeping device 104 or be used as a time reference to schedule an operation. As a non-limiting example, an apparatus 108 can be placed in a situation in which it will (or is expected to) lose its reference time and is unable to access any other previously configured clock to resynchronize its time keeping device 104 with a reference time. The apparatus 108 can include an embodiment of the system 100 or be in operative communication with an embodiment of the system 100. The system 100 can be used to provide a reference time that is an updated reference time 106 for the apparatus 108. It should be noted that the system 100 can be used to determine or update a reference time 106 with high precision and without input from a human source or from a previously configured clock.

Exemplary embodiments describe and illustrate the apparatus 108 as a spacecraft. An example of a spacecraft can be a vehicle used in space, a satellite in space, a telescope in space, etc. In some embodiments, the apparatus 108 can be the time keeping device 104. The time keeping device 104 can be part of the spacecraft or in operative communication with it. It is contemplated for the spacecraft to be used for operations that require an up-to-date and accurate time reference. For example the spacecraft can be a navigational satellite (e.g., GPS), a surveillance satellite, communications satellite, etc.

It will be appreciated that use of the apparatuses 108 is not limited to space. Any apparatus 108 (regardless of the environment it is placed in) that can benefit from an up-to-date and accurate time reference can be used.

A more detailed description of the system 100 is provided herein, but an overview of the operational aspects of an embodiment of the system 100 follows. An embodiment of the system 100 can be configured to receive an electromagnetic pulsar radiation from a pulsar 102. The system 100 can perform a folding signal processing function to increase the signal strength of the electromagnetic pulsar radiation and generate an observed rate or rotation (OROR) signal profile. This can involve determining the current rate of rotation (CROR) of the pulsar 102. Determining the CROR of the pulsar 102 can be achieved by using a previously recorded rate of rotation (RROR) for the pulsar 102 to define a recorded time period $T_{recorded}$ based on the RROR.

The pulsar's 102 rotational rate decays over time. As the rotation rate slows, the rotation period increases, which can distort OROR signal profile during the folding operation. To mitigate or account for the distortion, the CROR is determined by incrementing the period over which the electromagnetic pulsar radiation is folded to generate an updated OROR signal profile. The updated OROR signal profile can be compared to the previous OROR signal profile. If the updated OROR signal profile has a signal strength that is greater than the previous OROR signal profile, then the period used for the folding operation is more accurately reflective of the CROR. The incrementing of the folding period and the comparison can be iterated until a maximum signal strength is observed. The folding period corresponding to the maximum signal strength can be designated as the CROR. The CROR can be used to update the RROR for the pulsar 102 (e.g., the calculated CROR is recorded as the RROR for the pulsar 102).

A current time period $T_{current}$ can be defined based on the CROR. A rotational rate of decay (RROD) function can be established for each pulsar 102 that is a mathematical model representing the anticipated CROR at a given time. $T_{current}$ can be used to solve the RROD function for the pulsar 102 to output a reference time 106. The reference time 106 can be used as an update to a time keeping device 104.

An embodiment of the system 100 can include a database (DB) 110 configured to store pulsar information 101 about one or more pulsars 102. The DB 110 can include a non-volatile, non-transitory memory (e.g., as a Random Access Memory (RAM)), and be embodied as an in-memory DB, an active DB, a cloud DB, etc. An embodiment of the DB 110 can include a processor module and other circuitry to allow for the transfer of data to and from the DB 110, which can include to and from other components of the system 100. This transfer can be via hardwire or wireless transmission.

Any one or combination of components of the system 100 can include, or be configured as, a processor module. A processor module can be hardware (e.g., processor, integrated circuit, central processing unit, microprocessor, core processor, computer device, etc.), firmware, software, etc. configured to perform operations by execution of instructions embodied in algorithms, data processing program logic, automated reasoning program logic, etc. It will be appreciated that any one or combination of components of the system 100 can include switches, transmitters, transceivers, routers, gateways, wave-guides, etc. to facilitate communications via a communication protocol that facilitates controlled and coordinated signal transmission and processing to any other component or combination of components of the system 100. The transmission can be via a communication link. The communication link can be electronic-based, optical-based, opto-electronic-based, quantum-based, etc. In addition, any of the components can have an application programming interface (API) and/or other interfaces configured to facilitate a computer in communication with the system 100 executing commands and controlling aspects of any one or combination of components. For example, an embodiment of the system 100 can include a computer (e.g., a server, a mainframe computer, a desk top computer, a laptop computer, a tablet, a smartphone, etc.) configured to be in communication with any one or combination of components of the system 100. The computer can be programmed to generate a user interface configured to facilitate control of and display of various operational aspects of the system 100, including operational aspects of any component of the system 100.

Figure 5:
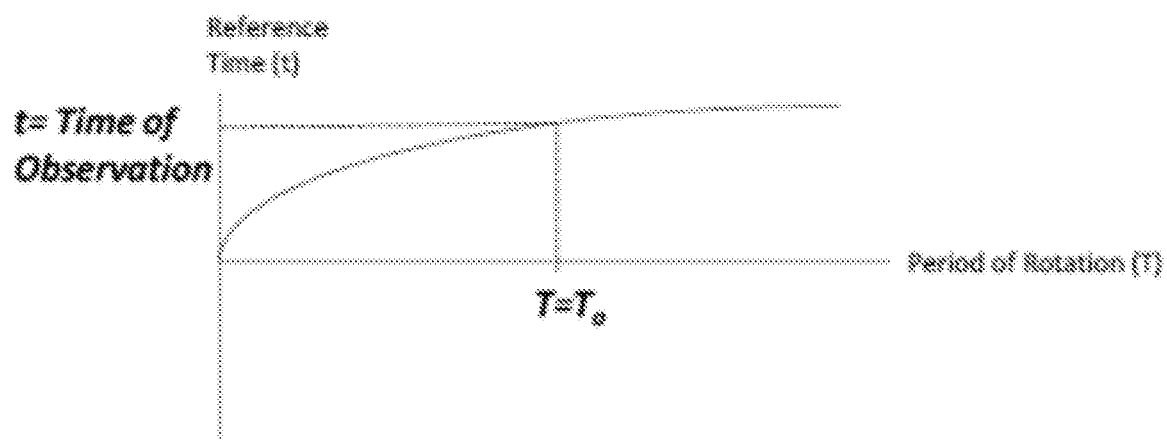
FIG. 5 shows an exemplary decay function curve representing an output that is reference time.

In one embodiment, the pulsar information 101 can include coordinates for the one or more pulsars 102. The coordinates can be obtained from a known catalog of pulsars. The pulsar information 101 can include a RROR for the one or more pulsars 102 recorded from observation at a previous reference time, wherein the RROR has a RROR period $T_{recorded}$. The RROR can be obtained from the known catalog of pulsars. In addition, or in the alternative, the RROR can be the previously determined CROR (as determined by the system 100). The pulsar information 101 can include a rotational rate of decay RROD function for the one or more pulsars 102. The RROD function can be obtained from the known catalog of pulsars. The RROD function is a mathematical model representing the anticipated CROR for a pulsar 102 at a given time. The RROD function outputs the period that is representative of the anticipated CROR as a function of time. The RROD function, however, can be used to output a time for a CROR of a pulsar 102 measured by the system 100. (See FIG. 5). This time can be used as the reference time 106. The pulsar information 101 can include a recorded reference time for the one or more pulsars 102, periodically updated by an internal clock. The recorded reference time can be obtained from the known catalog of pulsars. In addition, or in the alternative, the recorded reference time can be the previously determined reference time 106 (as determined by the system 100).

An embodiment of the system 100 can include a sensor 112 configured to collect electromagnetic pulsar radiation from the one or more pulsars 102 and generate sensor data. The sensor data is data that is characteristic the electromagnetic pulsar radiation. For example, the sensor data can be the amplitude, frequency, pulse duration, duty cycle, angle of incidence, etc.

An embodiment of the system 100 can include a signal processor module 114 configured to receive the sensor data from the one or more pulsars 102. The sensor 112 can be configured to transmit the sensor data to the signal processor module 114, or the signal processor module 114 can be configured to pull the sensor data from the sensor 112. In addition, the signal processor module 114 can be configured to pull the RROR associated with the one or more pulsars 102 from the DB 110. For example, the sensor 112 can collect sensor data from a first pulsar 102, sensor data from a second pulsar 102, sensor data from a third pulsar 102, etc. The first sensor data and the RROR of the first pulsar 102 can be transmitted to the signal processor module 114. The second sensor data and the RROR of the second pulsar 102 can be transmitted to the signal processor module 114. The third sensor data and the RROR of the third pulsar 102 can be transmitted to the signal processor module 114. While the disclosure describes the system 100 and method with a first, second, and third signals, it will be appreciated that more of less signals and pulsars 102 can be used. The description of three signals is for exemplary purposes.

Figure 6:
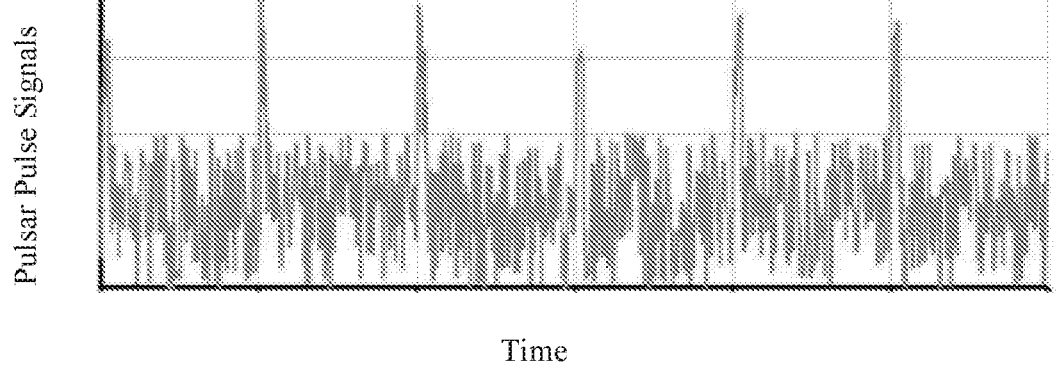
FIG. 6 shows an exemplary pulsar pulse signal train that can be observed with an embodiment of the system.

The signal processor module 114 can be configured to generate an OROR signal profile based on the sensor data and the RROR. For example, the signal processor module 114 can be configured to generate a first OROR signal profile based on the first sensor data and the first pulsar RROR, a second OROR signal profile based on the second sensor data and the second pulsar RROR, and a third OROR signal profile based on the third sensor data and the third pulsar RROR. The OROR signal profile can be a mathematical and/or graphical representation of the electromagnetic pulsar radiation of the pulsar 102 received by the sensor 112. The electromagnetic pulsar radiation is observed as pulses, and thus the OROR signal profile can be pulse train having plural pulse radiation emissions and pulse-intermediate radiation emissions that will occur between each pulse radiation emission. (See FIG. 6).

The signal processor module 114 can be configured to generate a CROR for the one or more pulsars 102 from the OROR signal profile, and update the RROR from the CROR. Determining the CROR of the pulsar 102 can be done by using a previously recorded RROR for the pulsar 102 to define a recorded time period $T_{recorded}$. The pulsar's 102 rotational rate decays over time. As the rotation rate slows, the rotation period increases, which can distort OROR signal profile during the folding operation. To mitigate or account for the distortion, the CROR is determined by incrementing the period over which the electromagnetic pulsar radiation is folded to generate an updated OROR signal profile. The folding signal process will be explained in detail later, but an embodiment of the folding signal process can involve identifying the folding period corresponding to the maximum signal strength, and setting that folding period as the CROR for the pulsar 102. The CROR can be used to update the RROR. The CROR can be used to define a current time period $T_{current}$, which can be used to solve the RROD function and generate a reference time 106.

For example, the signal processor module 114 can be configured to generate a first CROR based on the first OROR signal profile, which can be used to update the RROR of the first pulsar 102 with the first CROR, define a first $T_{current}$, and solve the RROD function of the first pulsar 102, using first $T_{current}$ to generate a first reference time 106. The signal processor module 114 can be configured to generate a second CROR based on the second OROR signal profile, which can be used to update the RROR of the second pulsar 102 with the second CROR, define a second $T_{current}$, and solve the RROD function of the second pulsar 102, using second $T_{current}$ to generate a second reference time 106. The signal processor module 114 can be configured to generate a third CROR based on the third OROR signal profile, which can be used to update the RROR of the third pulsar 102 with the third CROR, define a third $T_{current}$, and solve the RROD function of the third pulsar 102, using third $T_{current}$, to generate a third reference time 106.

An embodiment of the system 100 can include a time processor module 116 configured to receive the RROD function and the CROR. The signal processor module 114 can be configured to transmit the CROR to the time processor module 116, or the time processor module 116 can be configured to pull the CROR from the signal processor module 114. In one embodiment, the CROR can be transmitted to the DB 110, wherein the time processor module 116 can be configured to pull the CROR from the DB 110. In addition, the time processor module 116 can be configured to pull the RROR from the DB 110. For example, the time processor module 116 can be configured to receive the first RROD function and the first CROR, receive the second RROD function and the second CROR, and receive the third RROD function and the third CROR.

The time processor module 116 can be configured to solve the RROD function to output a reference time 106 of the one or more pulsars 102. For example, the time processor module 116 can be configured to use the first $T_{current}$ to solve the first RROD function to generate the first reference time 106, use the second $T_{current}$ to solve the second RROD function to generate the second reference time 106, and use the third $T_{current}$ to solve the third RROD function to generate the third reference time 106.

In one embodiment, the system 100 can be configured to transmit the reference time 106 as an update to a time keeping device 104. For example, the system 100 can be configured to transmit any one or combination of the first reference time 106, the second reference time 106, and the third reference time 106 as an update to a time keeping device 104. The time keeping device 104 can be a clock within the apparatus 108 or a clock in communicative connection with the apparatus 108. In one embodiment, the time keeping device 104 can be a high precision clock, such as a pulsar clock, an atomic clock, a quantum clock, etc.

In one embodiment, the system 100 can be configured in combination with the time keeping device 104. For example, the system 100 can be configured as a master clock. The time keeping device 104 can be configured as a slave clock. The slave clock can be configured to receive the reference time 106 from the master clock and increment the reference time 106 at a periodic rate.

In one embodiment, the sensor 112 can be an antenna configured to detect pulsar radiation within a radio wavelength spectrum. This can be a loop antenna, slot antenna, helical antenna, etc. In addition, or in the alternative, the sensor 112 can be a camera configured to detect pulsar radiation within an optical wavelength spectrum. This can be an optical camera, digital camera, charge coupled device, photodiode pixel array, etc. In addition, or in the alternative, the sensor 112 can be a semiconductor device configured to detect pulsar radiation within an x-ray wavelength spectrum. In addition, or in the alternative, the sensor 112 can be a semiconductor device configured to detect pulsar radiation within a gamma-ray wavelength spectrum. It will be appreciated that a pulsar can emit electromagnetic radiation across multiple bands, so any one or combination of sensors 112 disclosed herein can be used based on the type of radiation being observed and pulsar 102 being measured.

An embodiment of the system 100 can include a sensor orientation unit 120 configured to receive the coordinates for the one or more pulsars 102 to orientate the sensor 112 to maximize collection of pulsar radiation. The sensor orientation unit 120 can be configured to pull the coordinates of the pulsar 102 from the DB 110. Using the coordinates, the sensor orientation unit 120 can transmit instructions to at least one actuator in operative association with the sensor 112 to cause the sensor 112 to move. The movement (rotation, translation vertically or horizontally, angled, etc.) of the sensor 112 can be so that the sensor 112 is positioned to maximize the collection of pulsar radiation (e.g., maximize antenna gain for a sensor 112 configured as an antenna). For example, the relative position of the sensor 112 and the pulsar 102 can be used to determine the angle of incidence that the pulsar radiation is being received. The sensor 112 can be moved to adjust the angle of incidence. For instance, it may be beneficial to have the angle of incidence be normal to the collection surface of the sensor 112, or at least as close as can be achieved to an angle normal to the collection surface of the sensor 112. In addition, or in the alternative, other means to determine the optimal sensor 112 position can be used. For example, the sensor 112 can be moved until a maximum pulsar radiation signal is obtained by analyzing the sensor data as the sensor 112 is moved. The position of the sensor 112 corresponding to the maximum pulsar radiation signal can be used to determine the optimal sensor 112 position. It is contemplated for the actuator to be an electro-mechanical gimbal assembly, but other actuators can be used such as a phased array antenna for example.

In one embodiment, the signal processor module 114 can be configured to isolate electromagnetic pulsar radiation that is representative of the OROR by at least one of a signal filter 122 and a signal modulator 124. The signal filter 122 can be a device that filters undesired portions of a signal (e.g., background noise, interference, other emitters operating in the same frequency as the observed pulsar 102, etc.). Examples of filters and filtering techniques can include low pass filters, high pass filters, band filters, digital filters, absorptive filters, interference filters, Gabor filters, etc. The signal modulator 124 can be a device that modulates the electromagnetic pulsar radiation signal to a passband signal. The signal modulator 124 can also include a demodulator to demodulate the electromagnetic pulsar radiation signal to a baseband. Examples of modulators and modulation techniques can include analog modulators, digital modulators, frequency modulation, amplitude modulation, phase modulation, digital modulation, pulse modulation, etc. Other signal processing can be done, which can include smoothing, frequency-domain transforms, time-domain transforms, wavelet transforms, etc.

It will be appreciated that isolating electromagnetic pulsar radiation signal will be implementation-specific. An non-limiting, exemplary isolation process can involve directing the electromagnetic pulsar radiation signal through a low-pass filter. This can remove all noise above the electromagnetic pulsar radiation signal's frequency. The electromagnetic pulsar radiation signal can then be down-modulated to a frequency more manageable by a hardware component of the system 100. It is contemplated for the demodulation can be done to the baseband, but some implementations can involve a phased demodulation scheme through an intermediate frequency. The electromagnetic pulsar radiation signal can then be directed through a band-pass filter or low-pass filter, depending on the demodulation scheme, to further isolate the electromagnetic pulsar radiation signal from other sources of radiation.

Figure 8A:
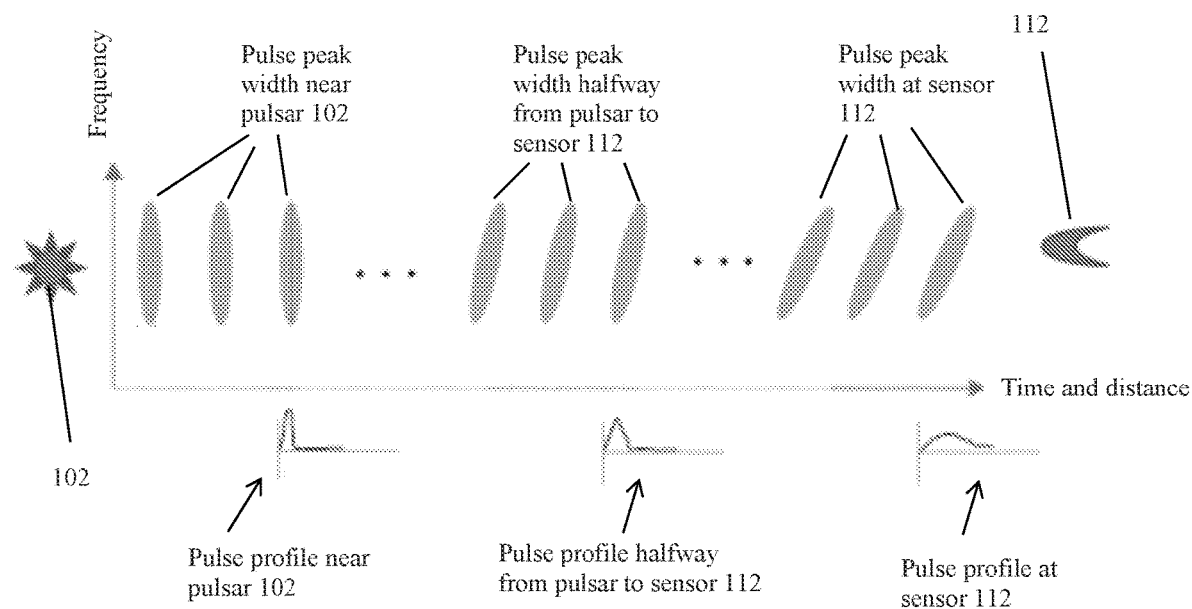
FIG. 8A shows a pulse dispersion effect that can occur to a pulse signal profile during collection of a pulsar signal.
Figure 8B:
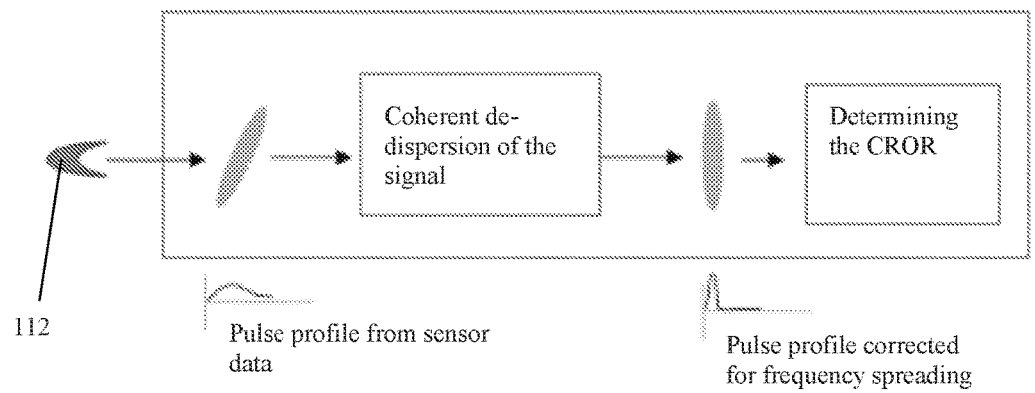
FIG. 8B shows and exemplary frequency-dependent time-only filter process flow that can be used with an embodiment of the system.

Referring to FIGS. 8A-8B, some embodiments can involve increasing the signal strength and sharpness by directing the electromagnetic pulsar radiation signal through a frequency-dependent, time-only filter 122. This can be done to perform coherent de-dispersion of the electromagnetic pulsar radiation signal, which can mitigate the effect of pulse dispersion caused by differing arrival times of the various frequency components of a pulsar's electromagnetic pulsar radiation signal. FIG. 8A shows each electromagnetic pulsar radiation signal having signal power across a swath of frequencies. Higher frequency electromagnetic waves travel faster through a medium than lower frequency electromagnetic waves travelling through the same medium. As the pulse of radiation travels, the higher frequency components of the pulse begin to move further in front of the lower frequency components of the pulse, causing the signal power to be spread out across a wider arrival time. This can cause the peak of the pulse profile to widen and be attenuated.

A wider pulse peak can make measuring the period between pulses less precise. By accounting for the differences in arrival time before the period of rotation is measured, a more precise measurement can be obtained. FIG. 8B shows an exemplary frequency-dependent time-only filter 122 process flow that can be used to perform coherent de-dispersion on the electromagnetic pulsar radiation signal. The frequency-dependent time-only filter 122 can be configured to change the time-phase of a signal's component frequencies based on their frequency. This processing technique can reverse the frequency spreading effect.

Figure 7:
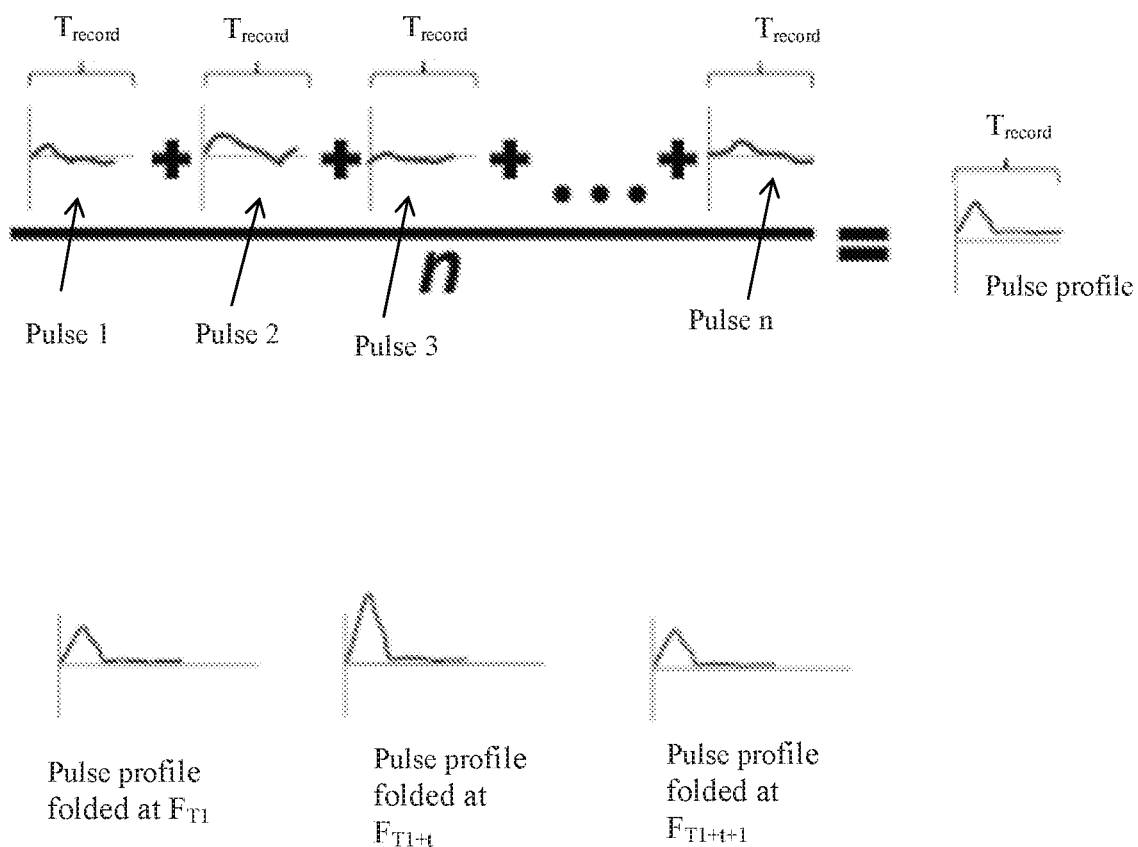
FIG. 7 illustrates an exemplary folding signal processing technique that can be used with an embodiment of the system.

Referring to FIG. 7, in one embodiment, the signal processor module 114 can be configured to generate the OROR signal profile by a signal folding module. The electromagnetic pulsar radiation collected by the sensor 112 can be very weak and non-uniform. Thus, the system 100 can perform a folding signal processing function to increase the signal strength of the electromagnetic pulsar radiation and generate an observed rate or rotation OROR signal profile. For example, to generate a usable OROR signal profile, the folding signal processing function can be used to fold the electromagnetic pulsar radiation signal by adding each individual electromagnetic pulsar radiation together. To fold the electromagnetic pulsar radiation signal via the folding technique, the CROR for the pulsar 102 should be determined. The CROR for the pulsar 102 can be determined by configuring the folding process to increment the period over which the electromagnetic pulsar radiation is folded. By incrementing the period over which the electromagnetic pulsar radiation is folded an updated OROR signal profile is generated. The updated OROR signal profile can be compared to the previous OROR signal profile. For example, a first OROR signal profile can be generated at a fold period $F_{T1}$. $F_{T1}$ can be set as the period equal to the RROR period. Alternatively, $F_{T1}$ can be determined by a direct measurement of the time between two pulse radiation emissions from the pulsar 102. The fold period can be incremented by t so that a second OROR signal profile is generated at a fold period $F_{T1+t}$. The signal strength of the first OROR signal profile can be compared to the signal strength of the second OROR signal profile. If the signal strength of the second OROR signal profile is greater than the signal strength of the first OROR signal profile, then this can be an indicator that $F_{T1+t}$ is more accurately reflective of the CROR. The fold period can be incremented by t+1 so that a third OROR signal profile is generated at a fold period $F_{T1+t+1}$. The signal strength of the third OROR signal profile can be compared to the signal strength of the second OROR signal profile and/or the signal strength of the first OROR signal profile. If the signal strength of the third OROR signal profile is greater than the signal strength of the first OROR signal profile and/or the signal strength of the second OROR signal profile, then this can be an indicator that $F_{T1+t+1}$ is more accurately reflective of the CROR. This process can be continued for additional OROR signal profiles generated by incrementing the fold period. It should be appreciated that incrementing by 1 is one exemplary method for determining the CROR and that other algorithms exist for testing fold periods for the one that maximizes the signal strength. The incrementing of the folding period and the comparison can be iterated until a maximum signal strength is observed. Testing folding periods to determine the CROR period is most effective when the pulse radiation emission is narrower and distinct from the pulse-intermediate radiation emissions between pulses. The signal processor module 114 can create a narrower and distinct pulse within the OROR signal profile by applying the coherent de-dispersion techniques described in herein. The folding period corresponding to the maximum signal strength can be set as the CROR. The CROR can be used to update the RROR. For example, the signal processor module 114 can be configured to transmit the CROR to the DB 110 to replace the previously recorded RROR.

In one embodiment, the signal processor module 114 can be configured to generate the OROR signal profile that includes a pulse train having plural pulse radiation emissions and pulse-intermediate radiation emissions that will occur between each pulse radiation emission. The signal processor module 114 can be configured to generate a pulse record for each pulse radiation emission and its following pulse-intermediate radiation emission by dividing an OROR signal into periods of time equal to the RROR period $T_{recorded}$.

In an exemplary implementation, the signal processor module 114 can be configured to fold the OROR signal by adding each pulse record into an integrated pulse record. The integrated pulse record can be a running average of pulse radiation emissions and their following pulse-intermediate radiation emissions. Some embodiments can include normalizing each pulse record. The folding of the OROR signal can involve adding each pulse record so that each pulse radiation emission within the pulse train is added to each other to generate the integrated pulse record having a single pulse radiation emission that is amplified. The folding of the OROR signal can involve adding each pulse record so that each pulse-intermediate emission within the pulse train is averaged-out with each other to generate the integrated pulse record having a single pulse-intermediate radiation emission that is attenuated. The adding to generate the amplified single pulse radiation emission and attenuated single pulse-intermediate radiation emission can be done to sharpen the signal for improved signal processing.

In another exemplary implementation, the signal processor module 114 can be configured to receive the OROR signal and designate it as an initial OROR signal. The signal processor module 114 can increment a period over which the initial OROR signal is folded to generate an updated OROR signal. The signal processor module 114 can compare a signal strength of the updated OROR signal to a signal strength of the initial OROR signal. The signal processor module 114 can continue incrementing the period over which the initial OROR signal is folded to identify a period at which a maximum signal strength is obtained. Other algorithms may be used to test the period over which the initial OROR signal is folded and selecting the one which maximizes the signal strength, without modifying the underlying system 100. The period at which a maximum signal strength is obtained being can be designated as the CROR. The CROR can be used to define a current time period $T_{current}$.

An embodiment of the system 100 can be configured to generate plural reference times 106 for plural pulsars 102, In one embodiment, the time processor module 116 can be configured to generate an estimated reference time from the plural reference times 106 based on an average of the plural reference times 106. The estimated reference time can be used in addition to or in lieu of the reference time 106 that is transmitted from the system 100. For example, the system 100 can be configured to transmit the estimated reference time to the time keeping device 104. The estimated reference time can be used synchronize a time keeping device 104 or as a time reference to schedule an operation.

Figure 9A:
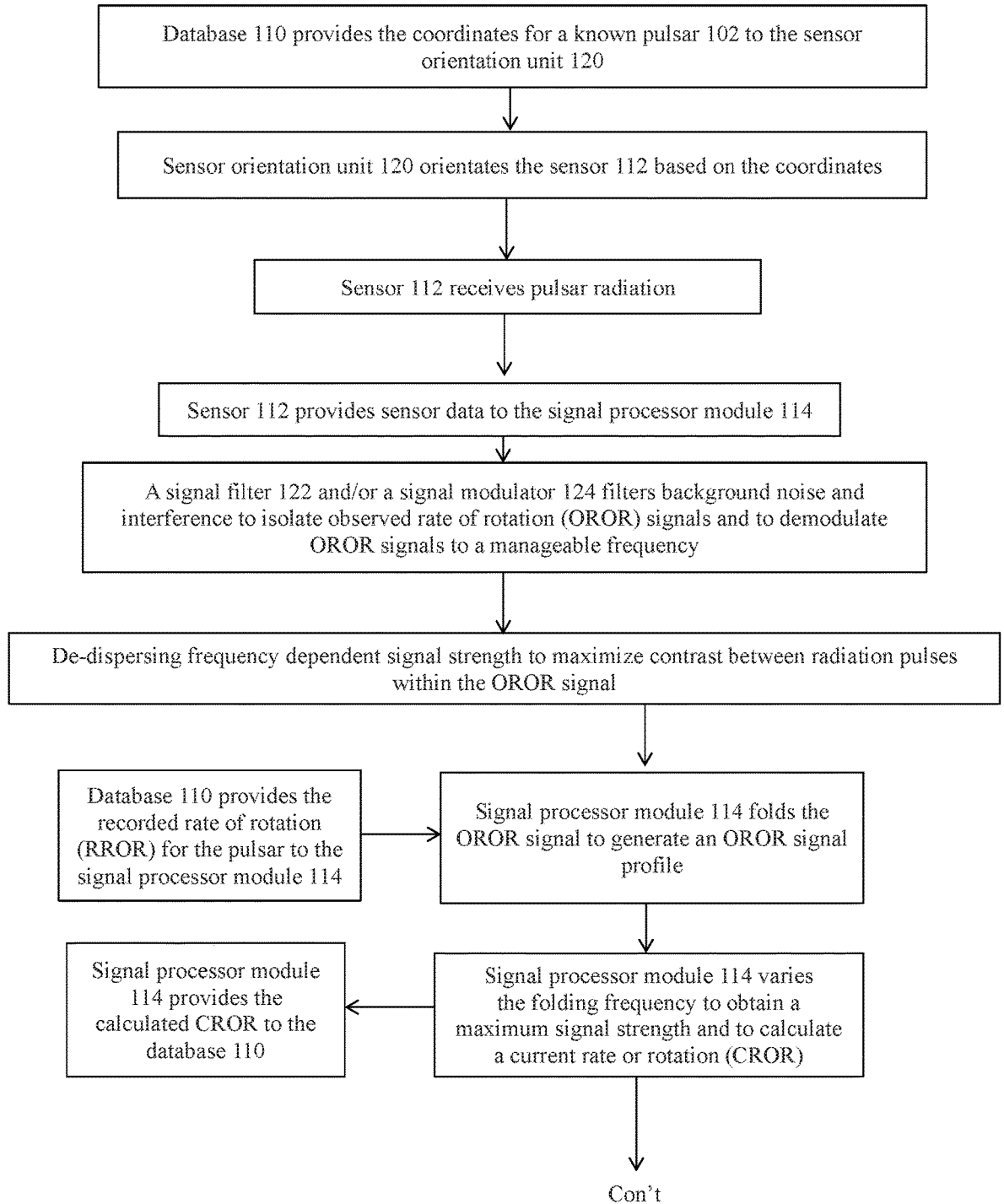
Figure 9B:
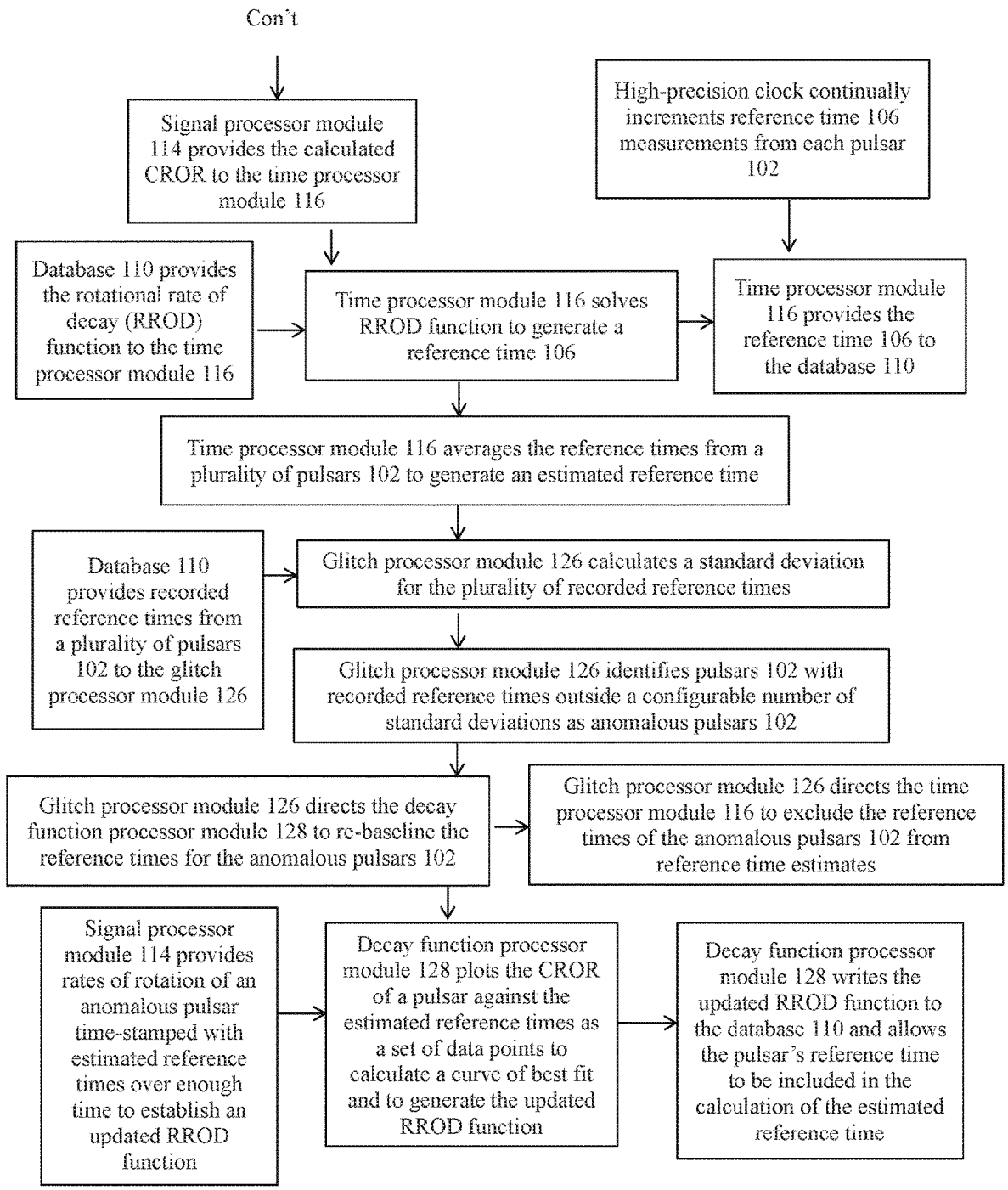

Referring to FIGS. 9A-9B, an embodiment of the system 100 can include a glitch processor module 126 configured to compare the recorded reference time for each pulsar 102 with the reference time of each pulsar 102 so that the glitch processor module 126 will identify the recorded reference times that are to be excluded from the average calculation. For example, the glitch processor module 126 can be configured to pull the recorded reference time from the DB 110 corresponding to a pulsar 102 and the calculated reference time 106 for the pulsar 102 (calculated from solving the RROD function). This can be done for plural pulsars 102 and plural of reference times. A glitch can be a change in a pulsar's rate of rotation has not been accounted for by the RROD function used by the time processor module 116. When a glitch occurs, the RROD function for a pulsar 102 may no longer be valid for measuring reference time 106. Thus, the RROD function can be re-baselined using the glitch processor module 126. Re-baselining the RROD function can involve the glitch processor module 126 identifying recorded reference time outliers so they can be exclude them from the estimated reference time calculation.

It will be appreciated that identifying a glitch will be implementation-specific. An non-limiting, exemplary glitch identification technique can involve configuring the glitch processor module 126 to calculate an average and standard deviation for the plural recorded reference times. A predetermined number of standard deviations from the average can be set as a measure to identify outlier recorded reference times. For example, the glitch processor module 126 can identify any recorded reference times that lie outside of the pre-determined number of standard deviations from the average. The pulsars 102 with recorded reference times lying outside the pre-determined number of standard deviations from the average can be designated as having experienced a glitch. The glitch processor module 126 can flag the pulsars 102 corresponding to the recorded reference times that lie outside of the pre-determined number of standard deviations from the average.

The glitch processor module 126 can be configured to transmit a signal to the time processor module 116 so that the time processor module 116 will exclude the flagged pulsars' recorded reference times from the average calculation.

The system 100 can include a decay function processor module 128 configured to receive an OROR signal of the flagged pulsar and record it with the reference time from one or more other pulsars 102 at which it was recorded to generate a series of ORORs and corresponding reference times. The decay function processor module 128 can be configured to plot a curve of best fit to the series of OROR and corresponding reference times. The decay function processor module 128 can be configured to update the flagged pulsar's RROD function with the calculated curve of best fit. This can be done by generating a re-baselined reference time 106 for the flagged pulsar 102 using the output of the updated RROD function associated with the flagged pulsar 102. As noted herein, the RROD function outputs the period that is representative of the anticipated CROR of a pulsar 102 as a function of time. The updated reference time 106 for the flagged pulsar 102 obtained from solving the RROD function of that pulsar 102 can be used to update the RROD function for that pulsar 102. This updating can be part of a process to re-baseline the RROD function for that pulsar 102. The re-baselined RROD function can be transmitted from the decay function processor module 128 to the DB 110 to replace the RROD function for the flagged pulsar 102. Once the re-baselined RROD function replaces the RROD function of the flagged pulsar 102, the decay function processor module 128 can transmit a single to the glitch processor module 126 to un-flagged the pulsar 102.

The decay function processor module 128 can be configured to transmit a signal to the to the time processor module 116 so that the time processor module 116 will include the re-baselined reference time with the curve of best fit analysis. For example, the time processor module 116, upon receiving the signal from the decay function processor module 128, can pull the re-baselined reference time for the pulsar 102 and include it within the curve of best fit analysis.

It will be appreciated that after initial data acquisition of the pulsar information 101 for storing it to the DB 110, the system 100 can operate autonomously to continuously obtain electromagnetic pulsar radiation, generate a CROR for the pulsar 102, generate a reference time 106, transmit updated reference times 106, update RROR and recorded reference times, determine which RROD function to be re-baselined, and update RROD functions. No input from a human source or from a previously configured clock is required.

In an exemplary implementation, a method for updating a reference time from a decaying rotational period of one or more pulsars 102 can involve storing pulsar information 101 about one or more pulsars.

The pulsar information 101 can include at least one of: coordinates for the one or more pulsars 102; a RROR for the one or more pulsars 102, recorded from observation at a previous reference time, wherein the RROR has a RROR period; a RROD function for the one or more pulsars 102; and a recorded reference time for the one or more pulsars 102, periodically updated by an internal clock.

An embodiment of the method can involve collecting pulsar radiation from the one or more pulsars 102, the pulsar radiation including an OROR for the one or more pulsars 102.

An embodiment of the method can involve generating an OROR signal profile based on the OROR and the RROR.

An embodiment of the method can involve generating a CROR for the one or more pulsars 102.

An embodiment of the method can involve solving the RROD function to generate an output that is a reference time 106 of the one or more pulsars 102.

An embodiment of the method can involve transmitting the reference time 106 to a time keeping device 104.

An embodiment of the method can involve synchronizing the time keeping device 104 with the reference time 106.

An embodiment of the method can involve scheduling an operation based on the reference time 106.

It will be understood that modifications to the embodiments disclosed herein can be made to meet a particular set of design criteria. For instance, any of the databases 110, sensors 112, sensor orientation units 120, time processor modules 116, glitch processor modules 126, decay function processor modules 126, or any other component of the system 100 can be any suitable number or type of each to meet a particular objective. Therefore, while certain exemplary embodiments of the system 100 and methods of using the same disclosed herein have been discussed and illustrated, it is to be distinctly understood that the invention is not limited thereto but can be otherwise variously embodied and practiced within the scope of the following claims.

It will be appreciated that some components, features, and/or configurations can be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein. Additionally, the disclosure of a range of values is a disclosure of every numerical value within that range, including the end points.

What is claimed is:

1. A system for updating a reference time from a decaying rotational period of one or more pulsars, the system comprising:
   a database (DB) configured to store pulsar information about one or more pulsars, the pulsar information including:
      coordinates for the one or more pulsars;
      a recorded rate of rotation (RROR) for the one or more pulsars, recorded from observation at a previous reference time, wherein the RROR has a RROR period;
      a rotational rate of decay (RROD) function for the one or more pulsars; and
      a recorded reference time for the one or more pulsars, periodically updated by an internal clock;
   a sensor configured to collect electromagnetic pulsar radiation from the one or more pulsars and generate sensor data;
   a signal processor module configured to receive the sensor data, generate an observed rate of rotation (OROR) signal profile based on the sensor data and the RROR, generate a current rate of rotation (CROR) for the one or more pulsars from the OROR signal profile, and update the RROR from the CROR; and
   a time processor module configured to receive the RROD function and the CROR, and to solve the RROD function to output a reference time of the one or more pulsars;
   wherein the system is configured to transmit the reference time as an update to a time keeping device and the system updating the reference time without having to receive an updated reference time from a previously configured clock.

2. The system recited in claim 1 in combination with the time keeping device, wherein:
the system is configured as a master clock; and
the time keeping device is a slave clock configured to receive the reference time from the master clock and increment the reference time at a periodic rate.

3. The system recited in claim 1, wherein the sensor comprises at least one of:
an antenna configured to detect pulsar radiation within a radio wavelength spectrum;
a camera configured to detect pulsar radiation within an optical wavelength spectrum;
a semiconductor device configured to detect pulsar radiation within an x-ray wavelength spectrum; and
a semiconductor device configured to detect pulsar radiation within a gamma-ray wavelength spectrum.

4. The system recited in claim 1, comprising:
a sensor orientation unit configured to receive the coordinates for the one or more pulsars to orientate the sensor to maximize collection of pulsar radiation.

5. The system recited in claim 1, wherein the signal processor module is configured to isolate electromagnetic pulsar radiation that is representative of the OROR by at least one of a signal filter and a signal modulator.

6. The system recited in claim 1, wherein the signal processor module is configured to generate the OROR signal profile by a signal folding module.

7. The system recited in claim 6, wherein the signal processor module is configured to:
generate the OROR signal profile that includes a pulse train having plural pulse radiation emissions and pulse-intermediate radiation emissions that will occur between each pulse radiation emission; and
generate a pulse record for each pulse radiation emission and its following pulse-intermediate radiation emission by dividing an OROR signal into periods of time equal to the RROR period.

8. The system recited in claim 7, wherein the signal processor module is configured to:
fold the OROR signal by adding each pulse record into an integrated pulse record by:
adding each pulse record so that each pulse radiation emission within the pulse train is added to each other to generate the integrated pulse record having a single pulse radiation emission that is amplified; and
adding each pulse record so that each pulse-intermediate emission within the pulse train is averaged-out with each other to generate the integrated pulse record having a single pulse-intermediate radiation emission that is attenuated.

9. The system recited in claim 8, wherein the signal processor module is configured to:
receive the OROR signal and designate it as an initial OROR signal;
increment a period over which the initial OROR signal is folded to generate an updated OROR signal;
compare a signal strength of the updated OROR signal to a signal strength of the initial OROR signal; and
continue incrementing the period over which the initial OROR signal is folded to identify a period at which a maximum signal strength is obtained, the period at which a maximum signal strength is obtained being designated as the CROR.

10. The system recited in claim 1, configured to generate plural reference times for plural pulsars.

11. The system recited in claim 10, wherein the time processor module is configured to generate an estimated reference time from the plural reference times based on an average of the plural reference times.

12. The system recited in claim 11, wherein the system is configured to transmit the estimated reference time to a time keeping device.

13. The system recited in claim 11, comprising:
a glitch processor module configured to compare the recorded reference time for each pulsar with the reference time of each pulsar so that the glitch processor module will identify the recorded reference times that are to be excluded from the average calculation.

14. The system recited in claim 13, wherein the glitch processor module is configured to:
calculate an average and standard deviation for the plural recorded reference times;
set a pre-determined number of standard deviations from the average;
identify any recorded reference times that lie outside of the pre-determined number of standard deviations from the average; and
flag the pulsars corresponding to the recorded reference times that lie outside of the pre-determined number of standard deviations from the average.

15. The system recited in claim 14, wherein the glitch processor module is configured to transmit a signal to the time processor module so that the time processor module will exclude the flagged pulsars' reference times from the average calculation.

16. The system recited in claim 15, comprising:
a decay function processor module configured to:
receive OROR signal of the flagged pulsar and record it with the reference time from one or more other pulsars at which it was recorded to generate a series of ORORs and corresponding reference times;
plot a curve of best fit to the series of OROR and corresponding reference times;
update the flagged pulsar's RROD function with the calculated curve of best fit; and
generate a re-baselined reference time for the flagged pulsar using the output of the updated RROD function.

17. The system recited in claim 16, wherein the decay function processor module is configured to transmit a signal to the to the time processor module so that the time processor module will include the re-baselined reference time with the curve of best fit analysis.

18. A method for updating a reference time from a decaying rotational period of one or more pulsars, the method comprising:
storing pulsar information about one or more pulsars, the pulsar information including:
coordinates for the one or more pulsars;
a recorded rate of rotation (RROR) for the one or more pulsars, recorded from observation at a previous reference time, wherein the RROR has a RROR period;
a rotational rate of decay (RROD) function for the one or more pulsars; and
a recorded reference time for the one or more pulsars, periodically updated by an internal clock;
collecting pulsar radiation from the one or more pulsars, the pulsar radiation including an observed rate of rotation (OROR) for the one or more pulsars;
generating an OROR signal profile based on the OROR and the RROR;
generating a current rate of rotation (CROR) for the one or more pulsars;

solving the RROD function to generate an output that is a reference time of the one or more pulsars; and transmitting the reference time to a time keeping device and updating the reference time without having to receive an updated reference time from a previously configured clock.

19. The method recited in claim 18, comprising:

synchronizing the time keeping device with the reference time.

20. The method recited in claim 18, comprising:

scheduling an operation based on the reference time.

* * * * *